United States Patent
Ee et al.

(10) Patent No.: US 12,230,299 B2
(45) Date of Patent: Feb. 18, 2025

(54) LOW PROFILE SUSPENSION DESIGN

(71) Applicant: Magnecomp Corporation, Murrieta, CA (US)

(72) Inventors: Kuen Chee Ee, Chino, CA (US); David Glaess, Bangkok (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 18/140,548

(22) Filed: Apr. 27, 2023

(65) Prior Publication Data

US 2023/0260541 A1 Aug. 17, 2023

Related U.S. Application Data

(62) Division of application No. 17/196,901, filed on Mar. 9, 2021, now Pat. No. 11,664,046.

(60) Provisional application No. 62/987,797, filed on Mar. 10, 2020.

(51) Int. Cl.
G11B 5/48 (2006.01)

(52) U.S. Cl.
CPC .......... *G11B 5/4813* (2013.01); *G11B 5/4833* (2013.01)

(58) Field of Classification Search
None
See application file for complete search history.

(56) References Cited

U.S. PATENT DOCUMENTS

| | | | |
|---|---|---|---|
| 5,057,953 A | 10/1991 | Wanlass | |
| 5,602,698 A | 2/1997 | Miyazaki et al. | |
| 5,731,931 A * | 3/1998 | Goss | G11B 21/21 360/244.9 |
| 5,870,252 A | 2/1999 | Hanrahan | |
| 6,014,289 A * | 1/2000 | Goss | G11B 5/4813 |
| 6,046,885 A * | 4/2000 | Aimonetti | G11B 5/4833 360/244.6 |
| 6,307,715 B1 * | 10/2001 | Berding | G11B 5/4833 360/244.8 |
| 6,894,876 B1 | 5/2005 | Coon | |
| 7,016,159 B1 | 3/2006 | Bjorstrom et al. | |
| 7,292,413 B1 | 11/2007 | Coon | |
| 7,459,835 B1 | 12/2008 | Mei et al. | |
| 7,542,240 B1 | 6/2009 | Bjorstrom et al. | |
| 8,498,082 B1 | 7/2013 | Padeski et al. | |
| 9,070,391 B1 | 6/2015 | Berscheit | |
| 9,123,364 B1 | 9/2015 | Apairmarn et al. | |
| 9,837,109 B1 | 12/2017 | Vanderlee | |
| 11,664,046 B2 | 5/2023 | Ee et al. | |

(Continued)

OTHER PUBLICATIONS

International Search Report and Written Opinion in International Application No. PCT/US2021/021733, mailed May 25, 2021.

(Continued)

*Primary Examiner* — William J Klimowicz
(74) *Attorney, Agent, or Firm* — DLA Piper LLP (US)

(57) ABSTRACT

A baseplate for a disk drive suspension is provided. The baseplate includes a receiving space at a distal end configured to mate with a spring of a load beam. The receiving space partially extends a length of the baseplate. The baseplate also includes a swage hub at a proximal end and an indented surface surrounding the swage hub. The proximal end is opposite the distal end. The indented surface is at least partially defined by a baseplate support section.

13 Claims, 9 Drawing Sheets

(56) References Cited

U.S. PATENT DOCUMENTS

| | | | |
|---|---|---|---|
| 2003/0039074 A1* | 2/2003 | Erpelding | G11B 5/4833 360/244.2 |
| 2003/0202293 A1 | 10/2003 | Nakamura et al. | |
| 2013/0293070 A1 | 11/2013 | Imuta | |
| 2014/0362475 A1* | 12/2014 | Bjorstrom | G11B 5/4833 360/245.7 |
| 2014/0368955 A1 | 12/2014 | Nishida et al. | |
| 2015/0255095 A1 | 9/2015 | Dexter et al. | |
| 2019/0318762 A1 | 10/2019 | Ee | |
| 2019/0362746 A1 | 11/2019 | Jahn et al. | |
| 2021/0295864 A1* | 9/2021 | Teo | G11B 5/4813 |

OTHER PUBLICATIONS

International Preliminary Report on Patentability in International Application No. PCT/US2021/021733, mailed Sep. 22, 2022.
Office Action in U.S. Appl. No. 17/196,901, mailed Oct. 25, 2021.
Office Action in U.S. Appl. No. 17/196,901, mailed May 9, 2022.
Office Action in U.S. Appl. No. 17/196,901, mailed Aug. 8, 2022.
Office Action in U.S. Appl. No. 17/196,901, mailed Oct. 21, 2022.
Notice of Allowance in U.S. Appl. No. 17/196,901, mailed Feb. 10, 2023.

* cited by examiner

LOW PROFILE SUSPENSION DESIGN

CROSS-REFERENCE TO RELATED APPLICATIONS

This application is a divisional of U.S. application Ser. No. 17/196,901 filed Mar. 9, 2021, which claims the benefit of U.S. Provisional Application No. 62/987,797 filed on Mar. 10, 2020, which is hereby incorporated by reference in its entirety.

FIELD

Embodiments of the disclosure relate to the field of suspensions for disk drives. More particularly, this disclosure relates to the field of suspensions and methods of attaching actuators used therein to the suspension.

BACKGROUND

Magnetic hard disk drives and other types of spinning media drives such as optical disk drives are well known. A typical disk drive unit includes a spinning magnetic disk containing a pattern of magnetic storage medium ones and zeroes on it that constitutes the data stored on the disk drive. The magnetic disk is driven by a drive motor. The disk drive unit further includes a disk drive suspension to which a magnetic read/write is mounted proximate a distal end of load beam. The "proximal" end of a suspension or load beam is the end that is supported, i.e., the end nearest to the baseplate which is swaged or otherwise mounted to an actuator arm. The "distal" end of a suspension or load beam is the end that is opposite the proximal end, i.e., the "distal" end is the cantilevered end.

The suspension is coupled to an actuator arm, which in turn is coupled to a voice coil motor that moves the suspension arcuately in order to position the head slider over the correct data track on the data disk. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only the voice coil motor moves the suspension. In a DSA suspension a small actuator located on the suspension moves the head slider in order to position the head slider over the correct data track. The actuator provides both finer positioning of the head slider than does the voice coil motor and provides higher servo bandwidth than does the voice coil motor. The actuator may be in various locations on the suspension depending on the DSA suspension design. Typically, left- and right-side actuators act in push-pull fashion to rotate the load beam or the distal end of the load beam. Most common DSA suspension designs placed the actuator on the baseplate, on load beam shelves, with actuation of the piezoelectric actuators (PZTs) causing the entire load beam to rotate. Actuators used in DSA suspension have been called milli-actuators or micro-actuators.

SUMMARY

A baseplate for a disk drive suspension is provided. The baseplate includes a receiving space at a distal end configured to mate with a spring of a load beam. The receiving space partially extends a length of the baseplate. The baseplate also includes a swage hub at a proximal end and an indented surface surrounding the swage hub. The proximal end is opposite the proximal end. The indented surface is at least partially defined by a baseplate support section.

In some embodiments of the baseplate, the baseplate may include a left-side mounting region and a right-side mounting region at the proximal end. Each mounting region includes at least one mounting shelf extending from the base plate and configured to receive an actuator. The disk drive suspension may be configured as a dual stage actuation suspension.

In some embodiments of the baseplate, an actuator mounting shelf closer to the distal end includes a mating element configured to abut the spring of the load beam. In some embodiments of the baseplate, each mounting region includes a section of the spring extended into the mounting region to function as a mounting shelf for the actuator. In some embodiments of the baseplate, the disk drive suspension includes a single stage actuation suspension. The indented surface may be shaped to correspond with an actuator arm profile area, outlined by the baseplate support section. The baseplate support section may be asymmetrical, or alternatively, symmetrical. In some embodiments of the baseplate, the receiving space includes an etched surface configured to mate with the spring of the load beam.

A disk drive suspension is also described. The disk drive suspension may include a load beam comprising a spring, and a base plate coupled to the spring of the load beam. The baseplate includes a receiving space at a distal end configured to mate with a spring of a load beam. The receiving space partially extends a length of the baseplate. The baseplate also includes a swage hub at a proximal end and an indented surface surrounding the swage hub. The distal end is opposite the proximal end. The indented surface is at least partially defined by a baseplate support section.

In some embodiments of the disk drive suspension, the baseplate may include a left-side mounting region and a right-side mounting region at the proximal end. Each mounting region includes at least one mounting shelf extending from the base plate and configured to receive an actuator. The disk drive suspension may be configured as a dual stage actuation suspension.

In some embodiments of the disk drive suspension, an actuator mounting shelf closer to the distal end includes a mating element configured to abut the spring of the load beam. In some embodiments of the disk drive suspension, each mounting region includes a section of the spring extended into the mounting region to function as a mounting shelf for the actuator. In some embodiments of the disk drive suspension, the disk drive suspension includes a single stage actuation suspension. The indented surface may be shaped to correspond with an actuator arm profile area, outlined by the baseplate support section. The baseplate support section may be asymmetrical, or alternatively, symmetrical. In some embodiments of the disk drive suspension, the receiving space includes an etched surface configured to mate with the spring of the load beam.

Other features and advantages of embodiments of the present disclosure will be apparent from the accompanying drawings and from the detailed description that follows.

BRIEF DESCRIPTION OF THE DRAWINGS

Embodiments of the present disclosure are illustrated by way of example and not limitation in the figures of the accompanying drawings, in which like references indicate similar elements and in which.

DETAILED DESCRIPTION

An apparatus is described. The apparatus may include a substrate and one or more sensors mounted to the substrate. The one or more sensors may be mounted to the substrate using adhesive bonding material and one or more spot welds.

Current disk drive suspensions include load beam shelf feature that increase the overall thickness of the load beam and the baseplate. This thickness may be a limiting factor for high platter drive with smaller disk space and impacting shock performance of a drive. The smaller disk space design will result in smaller distance from the E-block arm to the disk surface. Lowering the overall thickness of the suspension near the swaged area can increase the clearance to the disk surface. As a result, an improved design and manufacture process is described herein.

Figure 1:
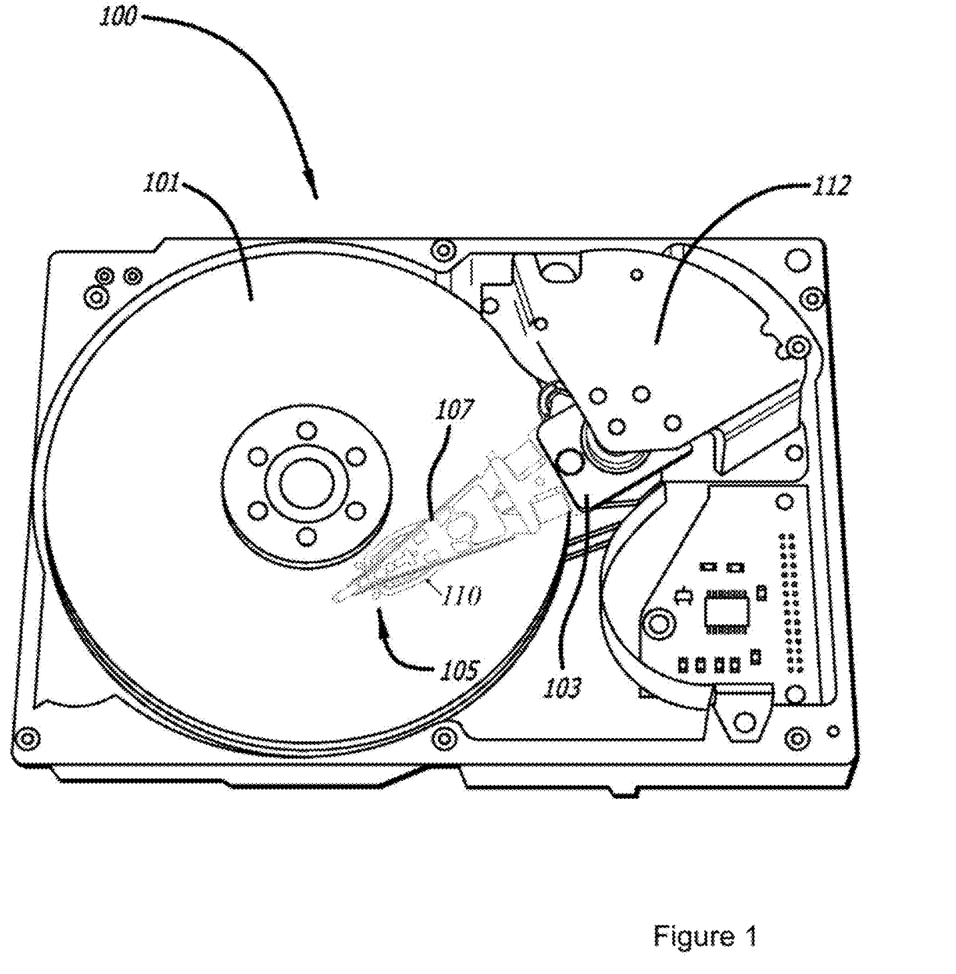
FIG. 1 illustrates a hard disk drive assembly, in accordance with embodiments of the disclosure.

FIG. 1 illustrates a hard disk drive assembly 100, in accordance with embodiments of the disclosure. As shown, the hard disk drive assembly 100 may include a spinning magnetic disk 101 containing a pattern of magnetic ones and zeroes on it that constitutes the data stored on the disk drive. The magnetic disk is driven by a drive motor.

The disk drive unit 100 can further include a disk drive suspension 105 to which a magnetic head slider 110 is mounted proximate a distal end of load beam 107. The suspension 105 may be coupled to an actuator arm 103, which in turn is coupled to a voice coil motor 112 that moves the suspension 105 arcuately in order to position head 110 over the correct data track on data disk 101. A magnetic head slider 110 is carried on a gimbal which allows slider 110 to pitch and roll so that the slider follows the data track on the disk. Carrying the magnetic head slider 110 on the gimbal also allows for such variations as vibrations of the disk, inertial events such as bumping, and irregularities in the disk's surface.

Figure 2:
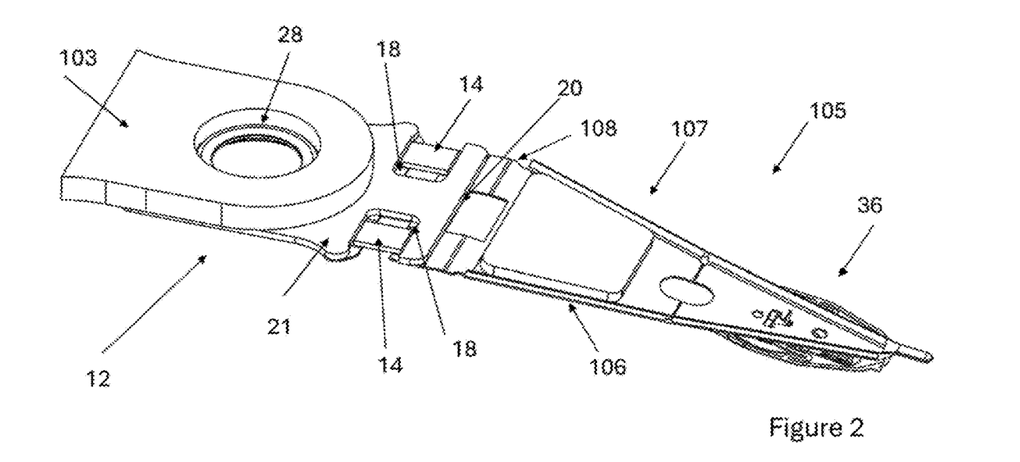
FIG. 2 is an oblique view of a DSA suspension, in accordance with embodiments of the disclosure.

FIG. 2 is an oblique view of a suspension 105, in accordance with embodiments of the disclosure. The suspension 105 can include a baseplate 12 and a load beam 107. The suspension 105 can also include one or two PZT actuators, such as milli-actuators 14, mounted to the baseplate 12 and the load beam 107. Expansion and contraction of the actuators, such as milli-actuators 14, moves the load beam 107 of the suspension 105, and more specifically, rotates the entire suspension 105. As shown, the load beam 107 may include a spring or hinge portion 108 and a beam portion 106, and a flexure gimbal assembly 36 to which a head slider carrying a read/write transducer head is attached at the distal end of the beam portion.

Suspension 105 can be a DSA suspension configured as a milli-DSA suspension or a micro-DSA suspension. A milli-DSA suspension is configured with an actuator, such as a milli-actuator, mounted to a baseplate. A micro-DSA suspension is configured with one or more actuators, such as micro-actuators, mounted to a flexure gimbal assembly. A suspension 105 can also be configured as a tri-stage actuator suspension. A tri-stage actuated suspension includes a milli-actuator mounted to a baseplate and one or more microactuators mounted on a flexure gimbal assembly.

The read/write head writes data to, and reads data from, the data medium which is a spinning magnetic disk drive, or possibly optical medium in an optical disk drive. The baseplate 12 may include a mounting portion 21 which is mounted to an actuator arm 103 via swage hub 28, and a distal tip 20 to which the hinge 108 is typically spot welded. The hinge 108 may be formed integrally with the beam portion 106 of the load beam 107. The load beam 107 may include the hinge 108. In alternative embodiments, the hinge 108 and the beam portion 106 can be formed separately and then welded together. Several structural variations from the generalized construction shown in FIG. 2 are possible.

Figure 3:
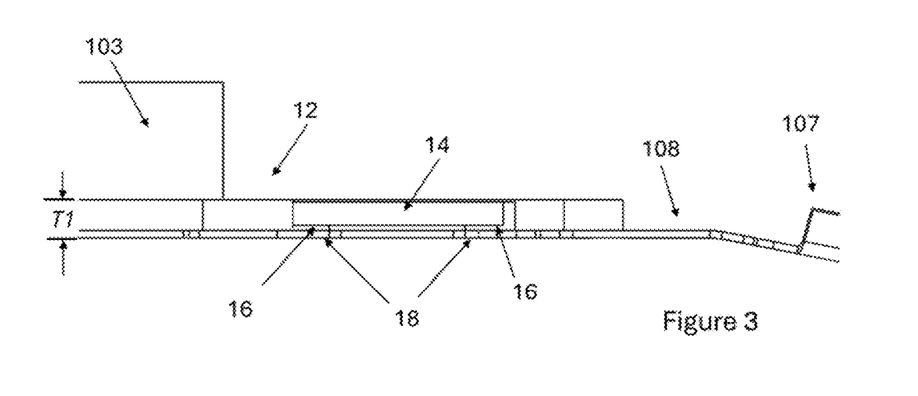
FIG. 3 illustrates a side profile of the DSA suspension of FIG. 2, in accordance with embodiments of the disclosure.

FIG. 3 illustrates a side profile of the suspension of FIG. 2, in accordance with embodiments of the disclosure. The baseplate 12 may be die cut or otherwise cut in a metal cutting operation from a relatively thick stainless-steel plate. In contrast, the hinge 108, beam portion 106, and the stainless-steel portion of flexure gimbal assembly 36 may be etched from thin sheets of stainless steel. The actuators, such as milli-actuators 14, may be mounted to the suspension 105 using adhesive 16 including non-conductive and/or conductive adhesive configured to provide an electrical connection to the actuators, such as milli-actuators 14.

The actuators, such as milli-actuators 14, are arranged in push-pull fashion within a projecting portion of the beam portion 106 that forms a microactuator mounting region. The microactuator mounting region includes microactuator mounting shelves 18. The actuators, such as milli-actuators 14, may be mounted onto the microactuator mounting shelves 18, requiring the load beam 107 to extend a partial length of the baseplate 12. The microactuator mounting shelves 18 increases the overall thickness T1 of the load beam 107 and the baseplate 12. This thickness may be a limiting factor for high platter drive with smaller disk space and impacting shock performance of a drive. The smaller disk space design may result in smaller distance from the E-block arm to the disk surface. Lowering the overall thickness T1 of the suspension 105 near the swaged area (at the actuator arm 103) can also increase the clearance to the disk surface.

Figure 4:
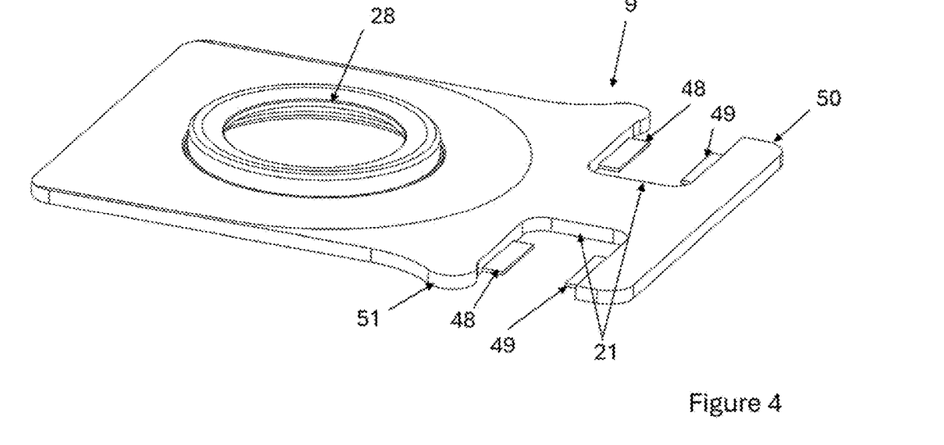
FIG. 4 illustrates a baseplate design, in accordance with an embodiment of the disclosure.

FIG. 4 illustrates a baseplate 9 design, in accordance with an embodiment of the disclosure. The baseplate 9 may include left and right-side mounting regions 21 for PZT actuators, such as milli-actuators 14, (shown in FIG. 1). The microactuator mounting region 21 includes microactuator mounting shelves 48 and 49, formed integral to the baseplate 9 such as by etching or stamping. The microactuator mounting region 21 may include a distal portion 50 of the suspension, and a proximal portion 51 of the suspension.

Figure 5:
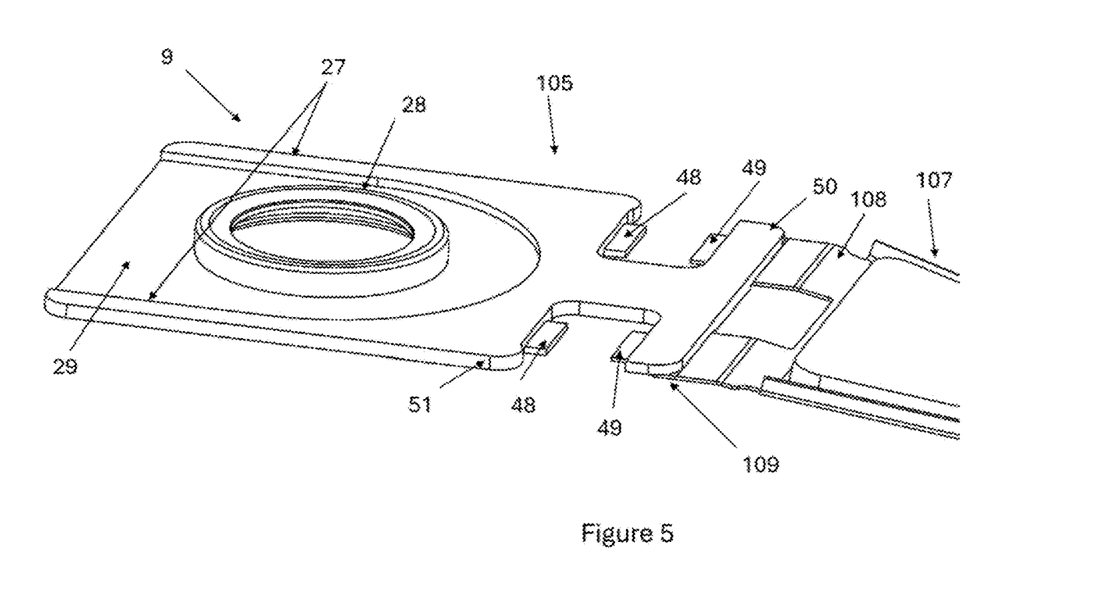
FIG. 5 illustrates the baseplate design of FIG. 4 incorporated in a DSA suspension, in accordance with an embodiment of the disclosure.

FIG. 5 illustrates the baseplate 9 of FIG. 4 incorporated in a DSA suspension 105, in accordance with an embodiment of the disclosure. As used herein, the term "proximal" merely designates the portion of the suspension 105 that lies proximal of the microactuators, i.e., closer to the swage hub 28 at which the suspension 105 is mounted to an actuator arm. Similarly, the term "distal" merely designates the portion of the suspension that lies distal of the microactuators, i.e., closer to the far end of the suspension 105 at which the flexure gimbal assembly 36 is mounted to suspension 105.

In the illustrative embodiment, the distal portion 50 may be connected to the hinge 108 or spring 109 that supports the load beam 107. The baseplate 9 may also include an indented surface 29 defined by a baseplate support section 27, near the proximal portion. The baseplate support section 27 provides stiffness to the baseplate 9. The indented surface 29 may reduce the overall thickness of the suspension 105 at the swage hub 28, increasing the clearance to the disk surface. The shape of the indented surface 29 may correspond with an actuator arm profile area, outlined by the baseplate support section 27. Moreover, the overall thickness can be reduced without impacting the stiffness of the baseplate 9 by having a reduced thickness region around the swage hub 28 corresponding to the actuator arm profile area. In this case, clearance to a disk surface can be increased near the swage hub 28.

Figure 6:
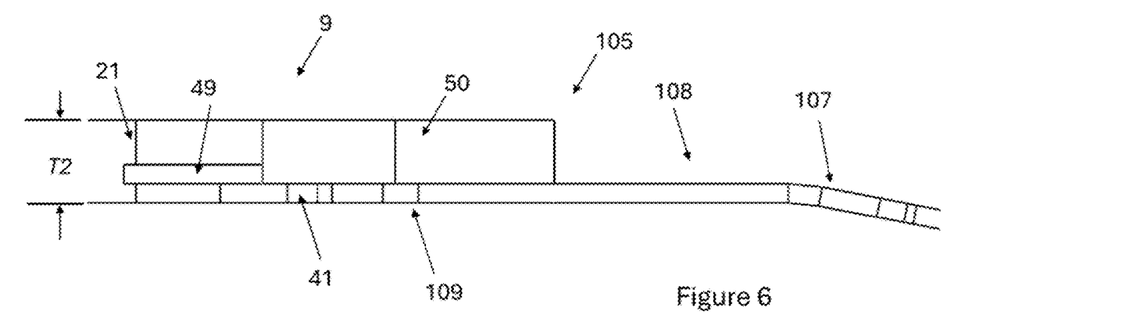
FIG. 6 illustrates a side profile of the DSA suspension of FIG. 5, in accordance with embodiments of the disclosure.

FIG. 6 illustrates a side profile of the suspension 105 of FIG. 5, in accordance with embodiments of the disclosure. The distal portion 50 of the baseplate 9 may include an etched surface configured to mate with the spring 109 of the load beam 107. The microactuator mounting shelf 49 may include a mating element 41, configured to abut the spring 109 of the load beam 107. As a result, the load beam 107 does not extend along the length of the baseplate 9, as compared to FIG. 3. The microactuator mounting shelves 48 and 49 reduces the overall thickness T2 of the load beam 107 and the baseplate 9. Thus, additional support from load beam 107 can be eliminated and the overall thickness can be reduced, compared to T1 of FIG. 3.

Figure 7:
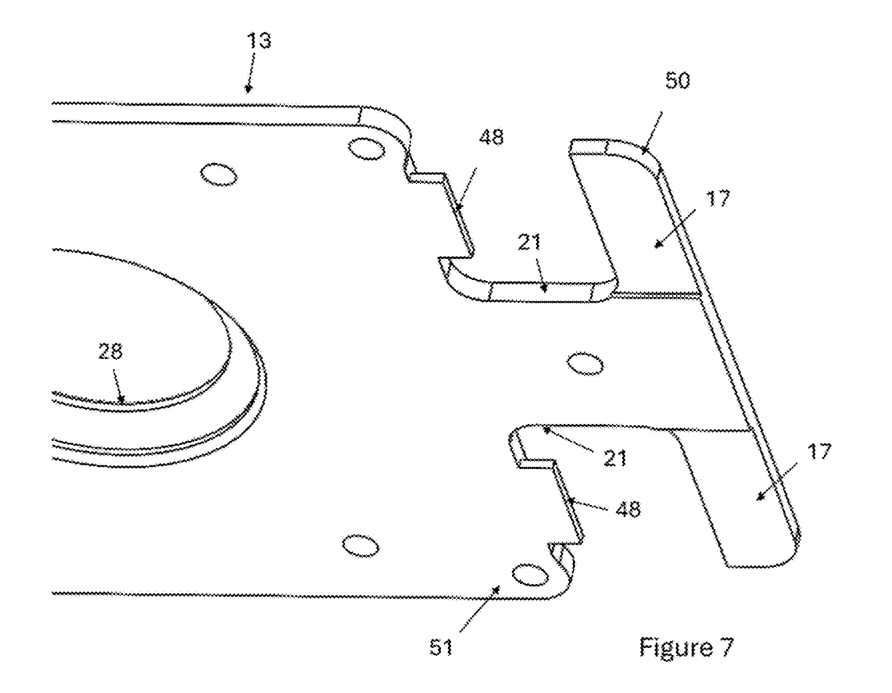
FIG. 7 illustrates an alternative baseplate design, in accordance with an embodiment of the disclosure.

FIG. 7 illustrates an alternative baseplate 13, in accordance with an embodiment of the disclosure. The baseplate 13 may include left and right-side mounting regions 21 for PZT actuators. Each actuator mounting region 21 can include a actuator mounting shelf 48. The actuator mounting shelf 48 may be formed integral to the baseplate 13 by etching or stamping. The actuator mounting region 21 may include a distal portion 50 of the suspension, and a proximal portion 51 of the suspension. As illustrated herein, the actuator mounting shelf 48 may extend from the proximal portion 51. The distal portion 50 may have a receiving space 17 in lieu of a mounting shelf 49 (as illustrated in FIG. 4).

Figure 8:
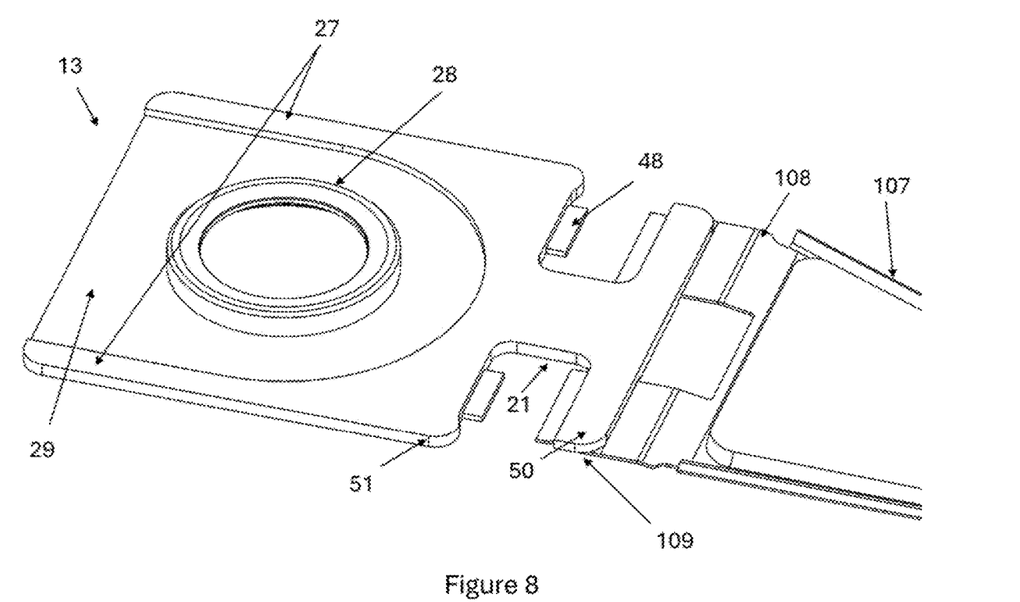
FIG. 8 illustrates the baseplate design of FIG. 7 incorporated in a DSA suspension, in accordance with an embodiment of the disclosure.

FIG. 8 illustrates the baseplate design of FIG. 7 incorporated in a suspension, in accordance with an embodiment of the disclosure. The thickness of the distal portion 50 is less than the thickness of the proximal portion 51. The receiving space 17 (shown in FIG. 7) may be configured to receive a portion of the load beam 107. Once coupled to the load beam 107, the thickness of the spring 109 and the distal portion 50 may be the same or less than the thickness of the proximal portion 51. Alternatively, the thickness of the spring 109 and the distal portion 50 may be the same or slightly more than the thickness of the proximal portion 51.

The distal portion 50 may be connected to the hinge 108 or spring 109 that supports the load beam 107. The spring 109 may extend into the actuator mounting region 21 and serve as a mounting shelf for actuators (shown in FIG. 2). The baseplate 13 may also include an indented surface 29 defined by a baseplate support section 27, near the proximal portion. The baseplate support section 27 provides stiffness to the baseplate 13. The indented surface 29 may reduce the overall thickness of the suspension at the swage hub 28, increasing the clearance to a disk surface. The shape of the indented surface 29 may correspond with an actuator arm profile area, outlined by the baseplate support section 27. Moreover, the overall thickness can be reduced without impacting the stiffness of the baseplate 13 by having a reduced thickness region around the swage hub 28 corresponding to the actuator arm profile area. In this case, clearance to the disk surface can be increased near the swage hub 28.

Figure 9:
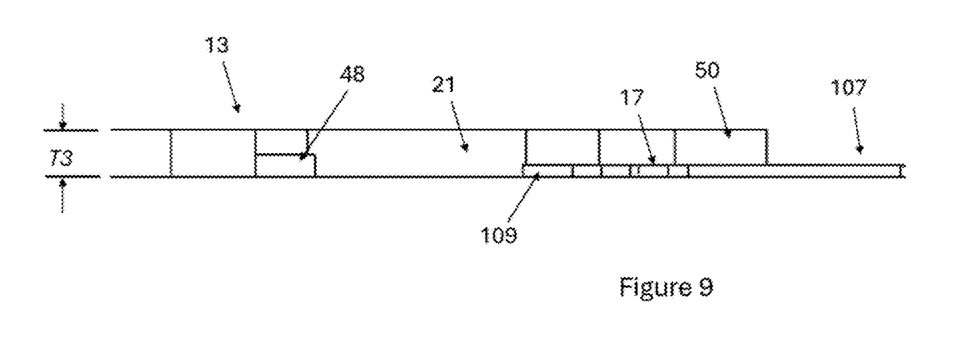
FIG. 9 illustrates a side profile of the DSA suspension of FIG. 8, in accordance with embodiments of the disclosure.

FIG. 9 illustrates a side profile of the DSA suspension of FIG. 8, in accordance with embodiments of the disclosure. The distal portion 50 of the baseplate 13 may include the receiving space 17 configured to mate with the spring 109 of the load beam 107. The spring 109 can extend into actuator mounting region 21 to serve as a mounting shelf, opposite the actuator mounting shelf 48. As a result, the load beam 107 does not extend along the length of the baseplate 13, as compared to FIG. 3. The coupling of the baseplate 13 and the load beam 107 at the receiving space 17 reduces the overall thickness T3 of the load beam 107 and the baseplate 13. Thus, additional support from load beam 107 can be eliminated and the overall thickness can be reduced.

Figure 10:
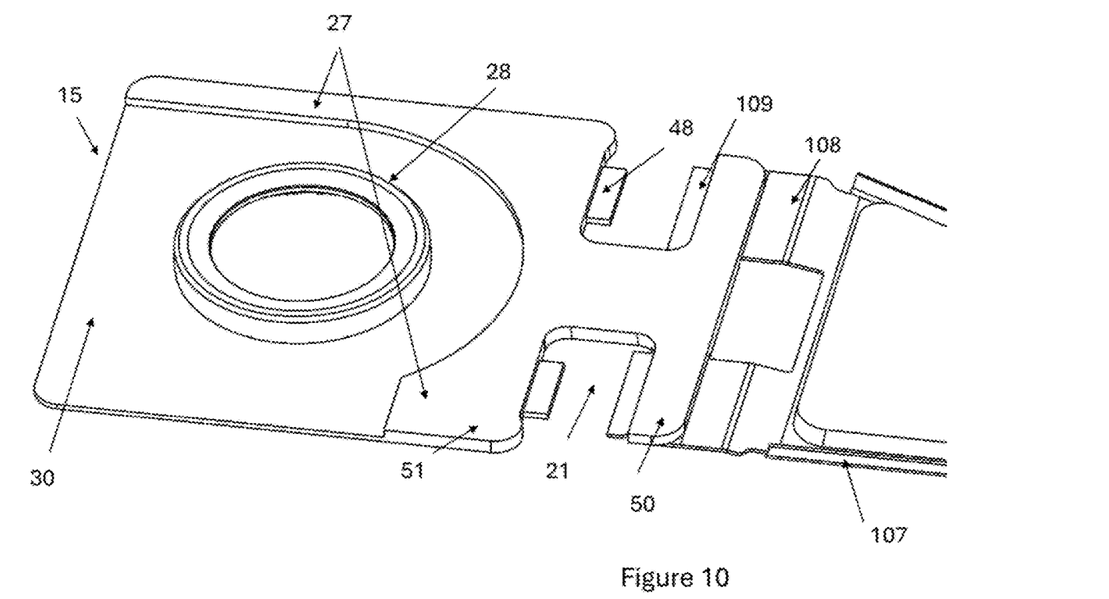
FIG. 10 illustrates an alternative baseplate design incorporated in a DSA suspension, in accordance with an embodiment of the disclosure.

FIG. 10 illustrates an alternative baseplate 15 incorporated in a suspension, in accordance with an embodiment of the disclosure. Similar to the embodiment discussed with respect to FIG. 8, the distal portion 50 may be connected to the spring 109 that supports the load beam 107. The baseplate 15 may also include an indented surface 30 defined by a partial baseplate support section 27, near the proximal portion. The partial baseplate support section 27 is asymmetrical. The baseplate support section 27 provides stiffness to the baseplate 15 on one side of the baseplate 15. The indented surface 30 may reduce the overall thickness of the suspension at the swage hub 28, increasing the clearance to the disk surface. The shape of the indented surface 30 may correspond with an actuator arm profile area, outlined by the partial baseplate support section 27. Moreover, the overall thickness can be reduced without impacting the stiffness of the baseplate 15 by having a reduced thickness region around the swage hub 28 corresponding to the actuator arm profile area. In this case, clearance to a disk surface can be increased near the swage hub 28.

The aforementioned embodiments have been directed to suspensions, where actuators are located on the suspension to effect fine arcuate movements of the head slider. The disclosed embodiments may be implemented in single-stage actuated disk drives, which include only voice coil motors, dual-stage actuated disk drives, tri-stage actuated disk drives, or other types of disk drives.

Figure 11:
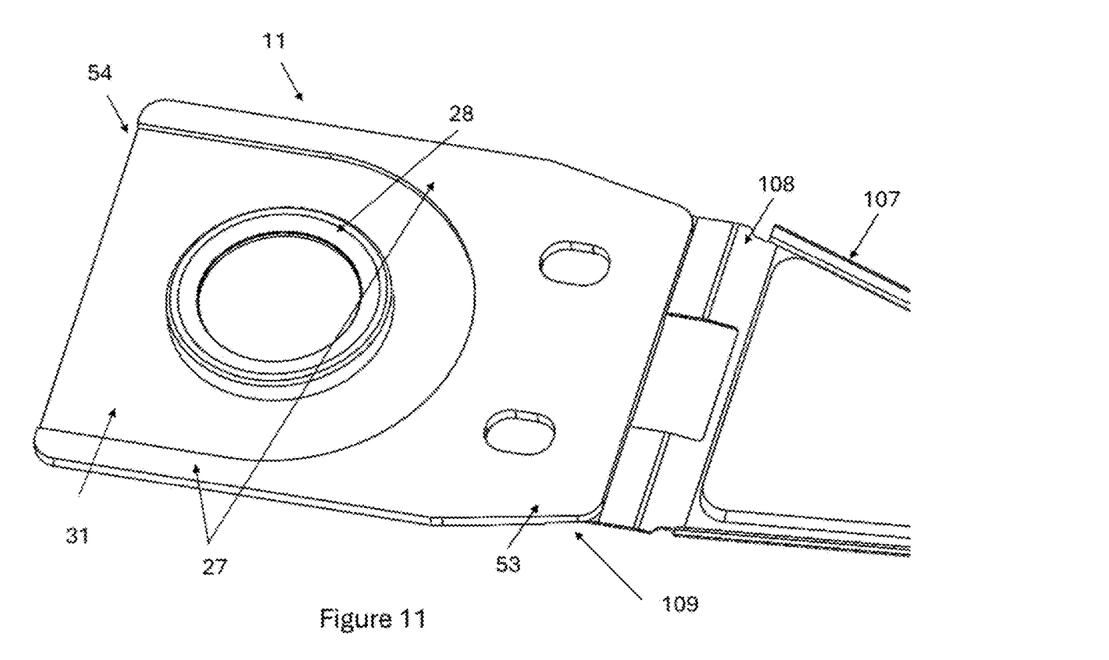
FIG. 11 illustrates an alternative baseplate design, in accordance with an embodiment of the disclosure, incorporated in a suspension.

FIG. 11 illustrates another embodiment of a baseplate 11, in accordance with an embodiment of the disclosure. As used herein, the term "proximal portion 54" merely designates the portion of the baseplate 11 that lies closer to the swage hub 28 at which the suspension is mounted to an actuator arm. Similarly, the term "distal portion 53" merely designates the portion of the suspension that lies closer to where the load beam 107 is mounted to baseplate 11.

In the illustrative embodiment, the distal portion 53 may be connected to the hinge 108 or spring 109 that supports the load beam 107. The baseplate 11 may include an indented surface 31 defined by a baseplate support section 27, near the proximal portion 54. The baseplate support section 27 provides stiffness to the baseplate 11. The indented surface 31 may reduce the overall thickness of the baseplate 11 at the swage hub 28, increasing the clearance to the disk surface. The shape of the indented surface 31 may correspond with an actuator arm profile area, outlined by the baseplate support section 27. Moreover, the overall thickness can be reduced without impacting the stiffness of the baseplate 11 by having a reduced thickness region around the swage hub 28 corresponding to the actuator arm profile area. In this case, clearance to a disk surface can be increased near the swage hub 28.

Figure 12:
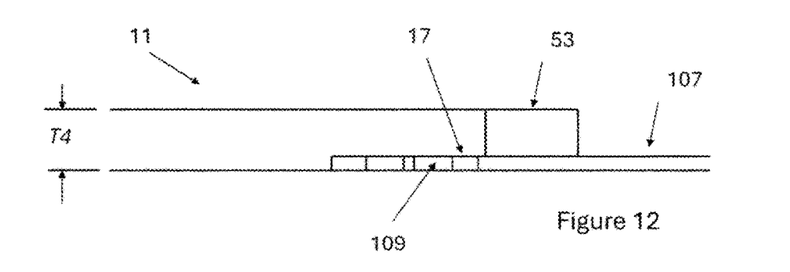
FIG. 12 illustrates a side profile of the single stage actuated suspension of FIG. 11, in accordance with embodiments of the disclosure.

FIG. 12 illustrates a side profile of the single stage actuated suspension of FIG. 11, in accordance with embodiments of the disclosure. The distal portion 53 of the baseplate 13 may include a receiving space 17 configured to mate with the spring 109 of the load beam 107. The spring 109 can partially extend along the length of the baseplate 11, as compared to FIG. 3. The coupling of the baseplate 11 and the load beam 107 at the receiving space 17 reduces the overall thickness T4 of the load beam 107 and the baseplate 11. Thus, additional support from load beam 107 can be eliminated and the overall thickness can be reduced.

Figure 13:
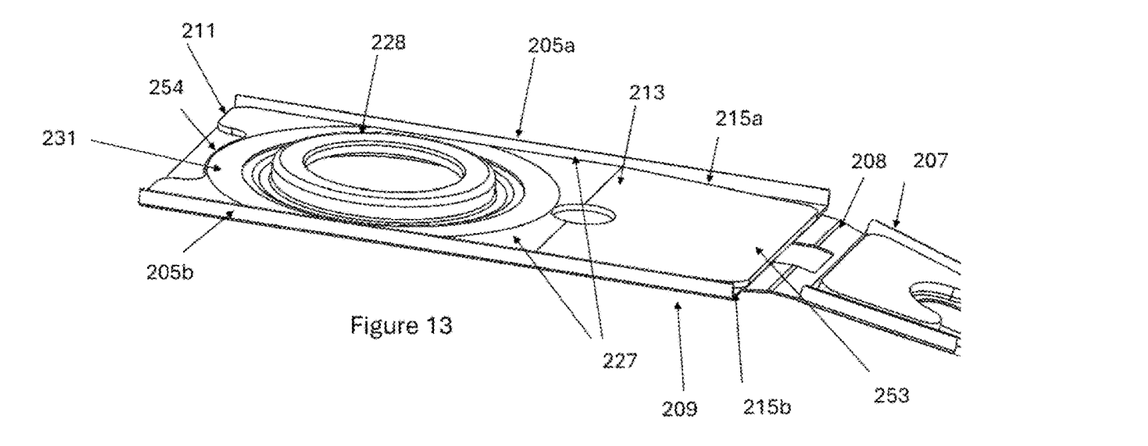
FIG. 13 illustrates a baseplate design with a rail on a load beam in accordance with an embodiment.

FIG. 13 illustrates a baseplate design with a rail on a load beam in accordance with an embodiment. As used herein, the term "proximal portion 254" merely designates the portion of a baseplate 211 that lies closer to the swage hub 228 at which the suspension is mounted to an actuator arm. Similarly, the term "distal portion 253" merely designates the portion of the suspension that lies closer to where the load beam 207 extends from the baseplate 211. The load beam 207, according to some embodiments, extends toward the proximate portion 254 of the baseplate 211. At least a portion of the load beam 207 is disposed under the baseplate 211. And, the baseplate 211 includes rails 205 that extend beyond the sides of the baseplate 211 and rises above a top surface 213 of the baseplate 211. According to some embodiments, the rails 205a, 205b are formed adjacent to each side 215 of the baseplate 211. For some embodiments, the rails 205a, 205b are formed in the load beam 207 adjacent to each side 215a, 215b of the baseplate 211 for a portion of each side 215a, 215b of the baseplate 211. The rails 205a, 205b are configured to increase the bending stiffness of the baseplate 211.

In the illustrative embodiment, the distal portion 253 may be connected to the hinge 208 or spring 209 that supports the load beam 207. The baseplate 211 may include an indented surface 231, such as those described herein, defined by a baseplate support section 227, such as those described herein, near the proximal portion 254. The baseplate support section 227 provides stiffness to the baseplate 211. The indented surface 231 is configured to reduce the overall thickness of the baseplate 211 at the swage hub 228, increasing the clearance to the disk surface. The shape of the indented surface 231, according to some embodiments, is configured to correspond with an actuator arm profile area, outlined by the baseplate support section 227. Moreover, the overall thickness can be reduced without impacting the stiffness of the baseplate 211 by having a reduced thickness region around the swage hub 228 corresponding to the actuator arm profile area. In this case, clearance to a disk surface can be increased near the swage hub 228. For some embodiments, the baseplate support section 227 and the indented portion 231 have the same thickness.

Figure 14:
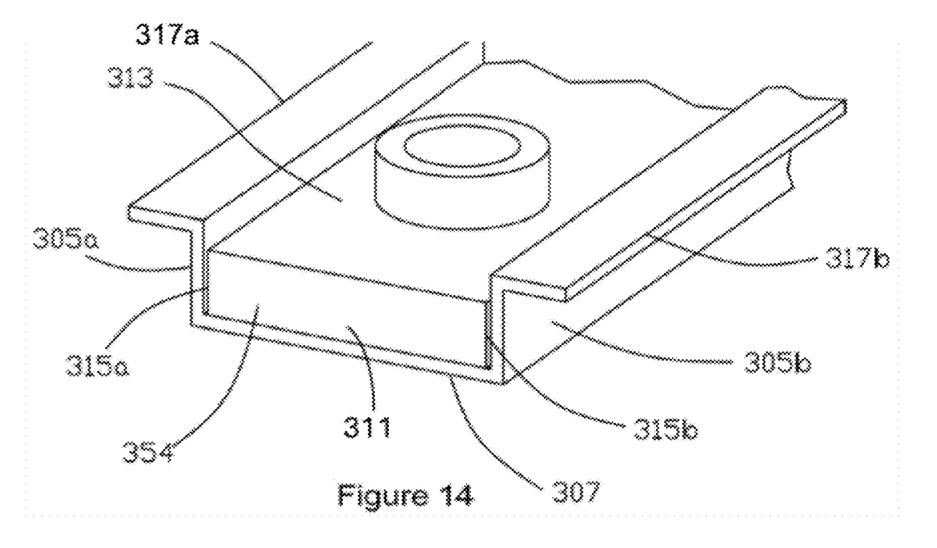
FIG. 14 illustrates a baseplate design including a rail on a load beam in accordance with an embodiment.

FIG. 14 illustrates a baseplate design including a rail on a load beam in accordance with an embodiment. The load beam 307, according to some embodiments, extends toward the proximate portion 354 of the baseplate 311, such as those described herein. At least a portion of the load beam 307 is disposed under the baseplate 311. And, the baseplate 311 includes rails 305a, 305b that extend beyond the sides of the baseplate 311 and rises above a top surface 313 of the baseplate 311.

According to some embodiments, the rails 305a, 305b are formed adjacent to each side 315a, 315b of the baseplate 311, such as those described herein. For some embodiments, the rails 305a, 305b are formed adjacent to each side 315a, 315b of the baseplate 311 for a portion of each side 315 of the baseplate 311. The rails 305a, 305b include a flange 317. The flange 317, according to some embodiments, is configured as a surface that extends in a direction away from the rail 305a, 305b. For some embodiments, the flange 317 is configured as a surface that extends in a direction away from both the rail 305a, 305b and the baseplate 311. For some embodiments, the flange are configured such that the rails 305a, 305b including flanges 317 are formed in a shape of approximately an upside-down, uppercase L. The flange 317, according to some embodiments, extend the entire length of the rail 305a, 305b. For other embodiments, the flange 317 extends along a portion of the rail 305a, 305b. The rails 305a, 305b with flanges 317 are configured to increase the bending stiffness of the baseplate 311. The flanges 317 enable avoiding high rail height, which may be less desirable during swaging or head stack assembly processes. In the illustrative embodiment, the distal portion 253 may be connected to a hinge or spring that supports the load beam 307 using techniques including those described herein.

Figure 15:
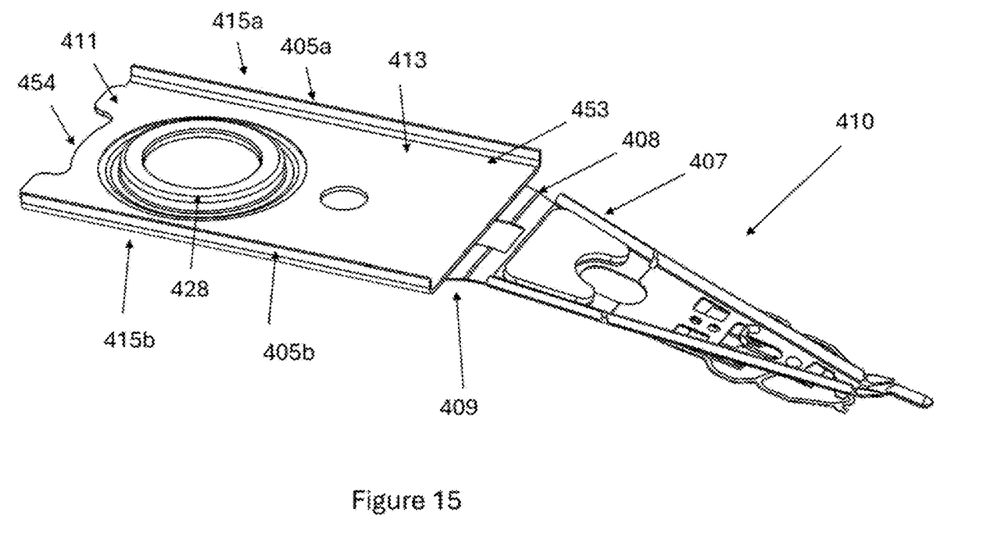
FIG. 15 illustrates a baseplate design including a rail in accordance with an embodiment.

FIG. 15 illustrates a baseplate design with a rail on a load beam in accordance with an embodiment. As used herein, the term "proximal portion 454" merely designates the portion of a baseplate 411 of a suspension 410, such as those described herein, that lies closer to the swage hub 428 at which the suspension is mounted to an actuator arm. Similarly, the term "distal portion 453" merely designates the portion of the suspension 410 that lies closer to where the load beam 407 extends from the baseplate 411. The load beam 407, according to some embodiments, extends toward the proximate portion 454 of the baseplate 411. At least a portion of baseplate 411 includes rails 405a, 405b and rises above a top surface 413 of the baseplate 411. According to some embodiments, the rails 405a, 405b are formed in the baseplate along each side 415a, 415b of the baseplate 411. For some embodiments, the rails 405a, 405b are formed along a portion of each side 415a, 415b of the baseplate 411. The rails 405a, 405b are configured to increase the bending stiffness of the baseplate 411. For some embodiments, the rails 405a, 405b include a flange, such as those described herein.

In the illustrative embodiment, the distal portion 453 may be connected to the hinge 408 or spring 409 that supports the load beam 407. The baseplate 411 may include an indented surface, such as those described herein, defined by a baseplate support section, such as those described herein, near the proximal portion 454. For some embodiments, the baseplate support section and the indented portion have the same thickness, such as those described herein.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

What is claimed is:

1. A disk drive suspension comprising: a baseplate, the baseplate including:
   a receiving space at a distal end configured to mate with a spring of a load beam, the receiving space partially extends a length of the baseplate;
   a swage hub at a proximal end, the proximal end is opposite the distal end;
   an indented surface surrounding the swage hub, the indented surface is at least partially defined by a baseplate support section; and
   a first rail extending along a first side of the baseplate and a second rail extending along a second side of the baseplate substantially in parallel with the first rail, wherein the first rail and the second rail each include a first end terminating at the distal end of the baseplate and a second end terminating at the proximal end of the baseplate, wherein the first rail and the second rail each include a first surface extending upward away from the baseplate and a flange that comprises a surface of the first rail and the second rail that extends away from the baseplate and is perpendicular to the first surface.

2. The disk drive suspension of claim 1, wherein the first rail and the second rail extend along the baseplate.

3. The disk drive suspension of claim 1, wherein the first rail and the second rail are formed in the load beam.

4. The disk drive suspension of claim 1, wherein the baseplate is configured to be used with a dual-stage actuated suspension.

5. The disk drive suspension of claim 1, wherein the baseplate is configured to be used with a tri-stage actuated suspension.

6. The disk drive suspension of claim 1, wherein the indented surface is shaped to correspond with an actuator arm profile area, outlined by the baseplate support section.

7. The disk drive suspension of claim 1, wherein the receiving space includes an etched surface configured to mate with the spring of the load beam.

8. A disk drive suspension comprising:
   a load beam including a spring; and
   a baseplate coupled to the spring of the load beam, the baseplate including:
   a receiving space at a distal end configured to mate with the spring of the load beam, the receiving space partially extends a length of the baseplate;
   a swage hub at a proximal end, the proximal end is opposite the distal end;
   an indented surface surrounding the swage hub, the indented surface is at least partially defined by a baseplate support section; and
   a first rail extending along a first side of the baseplate and a second rail extending along a second side of the baseplate substantially in parallel with the first rail, wherein the first rail and the second rail each include a first end terminating at the distal end of the baseplate and a second end terminating at the proximal end of the baseplate, wherein the first rail and the second rail are formed in the load beam and each include a first surface extending upward away from the baseplate and a flange that comprises a surface of the first rail and the second rail that extends away from the baseplate and is perpendicular to the first surface.

9. The disk drive suspension of claim 8, wherein the first rail and the second rail extend along the baseplate.

10. The disk drive suspension of claim 8, wherein the disk drive suspension is configured to be used with a dual-stage actuated suspension.

11. The disk drive suspension of claim 8, wherein the disk drive suspension is configured to be used with a tri-stage actuated suspension.

12. The disk drive suspension of claim 8, wherein the indented surface is shaped to correspond with an actuator arm profile area, outlined by the baseplate support section.

13. The disk drive suspension of claim 8, wherein the receiving space includes an etched surface configured to mate with the spring of the load beam.

* * * * *